United States Patent
Won

(10) Patent No.: US 11,794,740 B2
(45) Date of Patent: Oct. 24, 2023

(54) SMART CRUISE CONTROL SYSTEM AND METHOD OF CONTROLLING THE SAME

(71) Applicant: HL KLEMOVE CORP., Incheon (KR)

(72) Inventor: Giyeon Won, Suwon-si (KR)

(73) Assignee: HL KLEMOVE CORP., Incheon (KR)

(*) Notice: Subject to any disclaimer, the term of this patent is extended or adjusted under 35 U.S.C. 154(b) by 76 days.

(21) Appl. No.: 17/226,644

(22) Filed: Apr. 9, 2021

(65) Prior Publication Data

US 2021/0316728 A1    Oct. 14, 2021

(30) Foreign Application Priority Data

Apr. 13, 2020 (KR) .................. 10-2020-0044671

(51) Int. Cl.
*B60W 30/165* (2020.01)
*B60W 30/16* (2020.01)

(52) U.S. Cl.
CPC ........ *B60W 30/165* (2013.01); *B60W 30/162* (2013.01); *B60W 2420/42* (2013.01); *B60W 2420/52* (2013.01)

(58) Field of Classification Search
CPC ............. B60W 30/165; B60W 30/162; B60W 2420/42; B60W 2420/52
See application file for complete search history.

(56) References Cited

U.S. PATENT DOCUMENTS

| | | | |
|---|---|---|---|
| 2009/0105923 A1* | 4/2009 | Etori | B60W 10/18 701/96 |
| 2017/0080941 A1 | 3/2017 | Ono et al. | |
| 2017/0329348 A1* | 11/2017 | Li | G08G 1/22 |

FOREIGN PATENT DOCUMENTS

| | | |
|---|---|---|
| CN | 109878516 A | 6/2019 |
| JP | 2004-136800 A | 5/2004 |
| JP | 2005-145396 A | 6/2005 |
| JP | 2005-239114 A | 9/2005 |
| JP | 2018-165085 A | 10/2018 |
| KR | 10-1749873 B1 | 6/2017 |
| KR | 10-2019-0021840 A | 3/2019 |
| KR | 10-2019-0109622 A | 9/2019 |
| WO | 2019/159647 A1 | 8/2019 |

OTHER PUBLICATIONS

Office Action dated Jul. 5, 2023, for corresponding Chinese patent application No. 202110396668.2, along with an English translation (18 pages).
Korean Office Action dated Mar. 4, 2021, in connection with corresponding Korean Patent Application No. 10-2020-0044671, along with an English machine translation.

* cited by examiner

*Primary Examiner* — Alan D Hutchinson
*Assistant Examiner* — Andy Schneider
(74) *Attorney, Agent, or Firm* — Hauptman Ham, LLP

(57) ABSTRACT

A smart cruise control system includes a controller communicatively connected to a first sensor obtaining front image data and a second sensor obtaining front radar data, wherein the controller is configured to recognize a front vehicle based on the front image data and the front radar data, and in response to the front vehicle being not recognized in the front radar data and the front vehicle being recognized in the front image data, control the vehicle so that the vehicle is not accelerated even if the distance between the vehicle and the front vehicle recognized in the front image data is greater than the preset distance.

17 Claims, 6 Drawing Sheets

SMART CRUISE CONTROL SYSTEM AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0044671, filed on Apr. 13, 2020, the disclosure of which is incorporated herein by reference.

BACKGROUND

1. Field

The disclosure relates to a smart cruise control system for determining a target vehicle and following the target vehicle based on data obtained from a radar sensor and a camera, and a method of controlling the same.

2. Description of Related Art

In general, an adaptive cruise control (ACC) provides convenience to a driver by maintaining a vehicle speed according to external road conditions without stepping on a brake pedal or an accelerator pedal if the driver sets the vehicle speed to a constant speed.

Furthermore, in recent years, a smart cruise control system (SCC) has been developed that is equipped with a radar sensor and a camera in a vehicle to allow deceleration or acceleration while maintaining a distance from a front vehicle.

On the other hand, the SCC of a vehicle determines a target vehicle in front of the vehicle using a front radar and a front camera of the vehicle, and may control an acceleration control device, an engine control device, and a braking control device of a control vehicle using information such a distance between the vehicle and the target vehicle, a relative velocity, and an angle between a driving direction of the control vehicle, a preset longitudinal speed of the control vehicle and a preset acceleration limit value.

A conventional SCC combines radar data obtained from the front radar and image data obtained from the front camera in order to secure a reliability of the determination of the target vehicle, and determined a front vehicle, recognized by both the radar data and the image data, as the target vehicle to be followed.

Accordingly, when the radar data obtained from the front radar is temporarily invalid, the front vehicle driving in front of the vehicle is not recognized as the target vehicle, and thus a dangerous situation in which the vehicle is accelerated may occur.

SUMMARY

An aspect of the disclosure provides a smart cruise control system capable of preventing a dangerous situation by limiting an acceleration of a vehicle when radar data obtained from a front radar is temporarily invalid, and a method of controlling the same.

Additional aspects of the disclosure will be set forth in part in the description which follows and, in part, will be obvious from the description, or may be learned by practice of the disclosure.

According to an aspect of the disclosure, there is provided a smart cruise control system including: a front camera mounted to a vehicle, having a field of view in front of the vehicle, and configured to obtain front image data; a front radar mounted to the vehicle, having a field of sensing in front of the vehicle, and configured to front radar data; and a controller including a processor configured to process the front image data and the front radar data, to recognize a front vehicle in response to the processing of the front image data and the front radar data, and configured to determine the recognized front vehicle as a target vehicle in response to the front vehicle being recognized in both the front image data and the front radar data, and to control the vehicle to accelerate the vehicle in response to a distance between the vehicle and the target vehicle being greater than a preset distance in order to maintain the distance between the vehicle and the target vehicle. In response to the front vehicle being not recognized in the front radar data and the front vehicle being recognized in the front image data, the controller may be configured to control the vehicle so that the vehicle is not accelerated even if the distance between the vehicle and the front vehicle recognized in the front image data is greater than the preset distance.

In response to the front vehicle not being recognized in both the front image data and the front radar data, the controller may be configured to control the vehicle so that a speed of the vehicle becomes a preset speed.

In response to the distance between the vehicle and the front vehicle recognized in the front image data being smaller than the preset distance, the controller may be configured to control the vehicle to decelerate the vehicle.

The controller may be configured to determine a target acceleration of the vehicle based on the distance between the vehicle and the target vehicle.

In response to the distance between the vehicle and the target vehicle being smaller than the preset distance, the controller may be configured to control the vehicle so that the vehicle is decelerated.

In response to the distance between the vehicle and the target vehicle being the preset distance, the controller may be configured to control the vehicle to maintain a speed of the vehicle.

The controller may be configured to calculate a free space based on the front image data, and to determine a distance between the vehicle and a boundary line of the free space in front of the vehicle as the distance between the vehicle and the front vehicle.

According to another aspect of the disclosure, there is provided a smart cruise control method including: obtaining, by a front camera, front image data of a vehicle; obtaining, by a front radar, front radar data of the vehicle; processing, by a controller, the front image data and the front radar data; recognizing, by the controller, a front vehicle in response to the processing of the front image data and the front radar data; determining, by the controller, the recognized front vehicle as a target vehicle in response to the front vehicle being recognized in both the front image data and the front radar data; controlling, by the controller, the vehicle to accelerate the vehicle in response to a distance between the vehicle and the target vehicle being greater than a preset distance in order to maintain the distance between the vehicle and the target vehicle; and in response to the front vehicle being not recognized in the front radar data and the front vehicle being recognized in the front image data, controlling, by the controller, the vehicle so that the vehicle is not accelerated even if the distance between the vehicle and the front vehicle recognized in the front image data is greater than the preset distance.

The smart cruise control method may further include, in response to the front vehicle not being recognized in both the front image data and the front radar data, controlling, by the controller, the vehicle so that a speed of the vehicle becomes a preset speed.

The smart cruise control method may further include, in response to the distance between the vehicle and the front vehicle recognized in the front image data being smaller than the preset distance, controlling, by the controller, the vehicle to decelerate the vehicle.

The controlling of the vehicle to accelerate the vehicle in response to a distance between the vehicle and the target vehicle being greater than a preset distance in order to maintain the distance between the vehicle and the target vehicle may include determining a target acceleration of the vehicle based on the distance between the vehicle and the target vehicle; and accelerating the vehicle with the target acceleration.

The smart cruise control method may further include, in response to the distance between the vehicle and the target vehicle being smaller than the preset distance, controlling, by the controller, the vehicle so that the vehicle is decelerated.

The smart cruise control method may further include, in response to the distance between the vehicle and the target vehicle being the preset distance, controlling, by the controller, the vehicle to maintain a speed of the vehicle.

The controlling of the vehicle so that the vehicle is not accelerated even if the distance between the vehicle and the front vehicle recognized in the front image data is greater than the preset distance may include calculating a free space based on the front image data; and determining a distance between the vehicle and a boundary line of the free space in front of the vehicle as the distance between the vehicle and the front vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
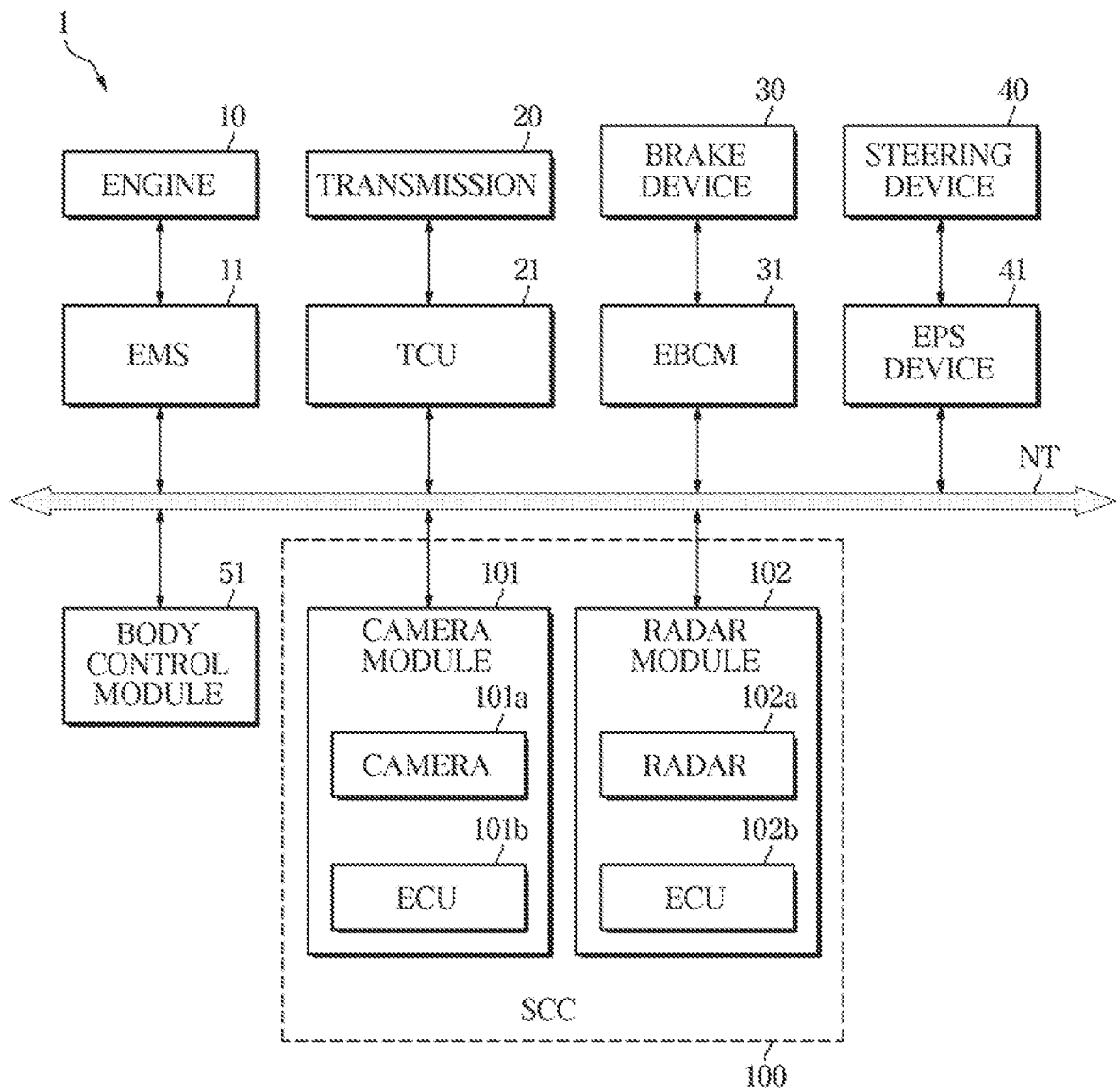
FIG. 1 is a view illustrating a configuration of a vehicle according to an embodiment.

The following description is merely exemplary in nature and is not intended to limit the present disclosure, application, or uses. It should be understood that throughout the drawings, corresponding reference numerals indicate like or corresponding parts and features.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware.

However, the terms "part," "module," "unit," and the like are not limited to software or hardware. "Part," "module," "unit," and the like may be configured in a recording medium that can be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Throughout the specification, a "front vehicle" may refer to a vehicle that is driving in a lane in which a vehicle 1 is driving and is driving in front of the vehicle 1.

In addition, a "target vehicle" may refer to a vehicle to be followed by a smart cruise control system (SCC) 100.

Hereinafter, embodiments of the SCC 100 and its control method will be described in detail with reference to the accompanying drawings so that those of ordinary skill in the art to which the disclosed invention pertains can easily implement them. And in order to clearly describe the disclosure disclosed in the drawings, parts not related to the description will be omitted. In addition, in the drawings, the same reference numerals denote the same components, and redundant descriptions thereof will be omitted.

Hereinafter, operation principles and embodiments of the disclosure will be described with reference to accompanying drawings.

FIG. 1 is a view illustrating a configuration of a vehicle according to an embodiment.

Referring to FIG. 1, a vehicle 1 may include an engine 10, a transmission 20, a braking device 30, and a steering device 40. The engine 10 may include a cylinder and a piston, and may generate power for the vehicle 1 to drive. The transmission 20 may include a plurality of gears, and may transmit power generated by the engine 10 to wheels. The braking device 30 may decelerate or stop the vehicle 1 through friction with the wheels. The steering device 40 may change a driving direction of the vehicle 1.

The vehicle 1 may include a plurality of electrical components. For example, the vehicle 1 further includes an engine management system (EMS) 11, a transmission control unit (TCU) 21, and an electronic brake control module (EBCM) 31), an electronic power steering (EPS) 41, a body control module (BCM), and the SCC.

The EMS 11 may control the engine 10 in response to acceleration intent of the driver through an accelerator pedal or a request of the SCC 100. For example, the EMS 11 may control torque of the engine 10.

The EMS 11 may perform fuel injection control, fuel economy feedback control, lean combustion control, ignition timing control, and idling speed control. The EMS 11 may not only be a single device, but may also be a plurality of devices connected through communication.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates a steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The SCC 100 may assist the driver in manipulating (driving, braking, steering) the vehicle 1. For example, the SCC 100 may detect a surrounding environment (e.g., a front vehicle, a lane, etc.) around the vehicle 1 and control the driving and/or braking and/or steering of the vehicle 1 in response to the sensed surrounding environment.

The SCC 100 may include a camera module 101 for obtaining image data in front of the vehicle 1 and a radar module 102 for obtaining obstacle data in front of the vehicle 1. The camera module 101 may include a camera 101a and an electronic control unit (ECU) 101b, and may capture the front of the vehicle 1 and recognize other vehicles, pedestrians, cyclists, lanes, road signs, and the like. The radar module 102 may include a radio detecting and ranging (radar) 102a and an electronic control unit (ECU) 102b, and may obtain relative positions and relative velocities of obstacles (e.g., other vehicles, pedestrians, cyclists, and the like) in front of the vehicle 1.

The SCC 100 is not limited to that illustrated in FIG. 1, and may further include a Light Detection And Ranging (LiDAR) that scans around the vehicle 1 and detects the object.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. For example, the SCC 100 may transmit a driving signal, a braking signal, and a steering signal to the EMS 11, the EBCM 31, and the EPS 41, respectively, through the NT.

Figure 2:
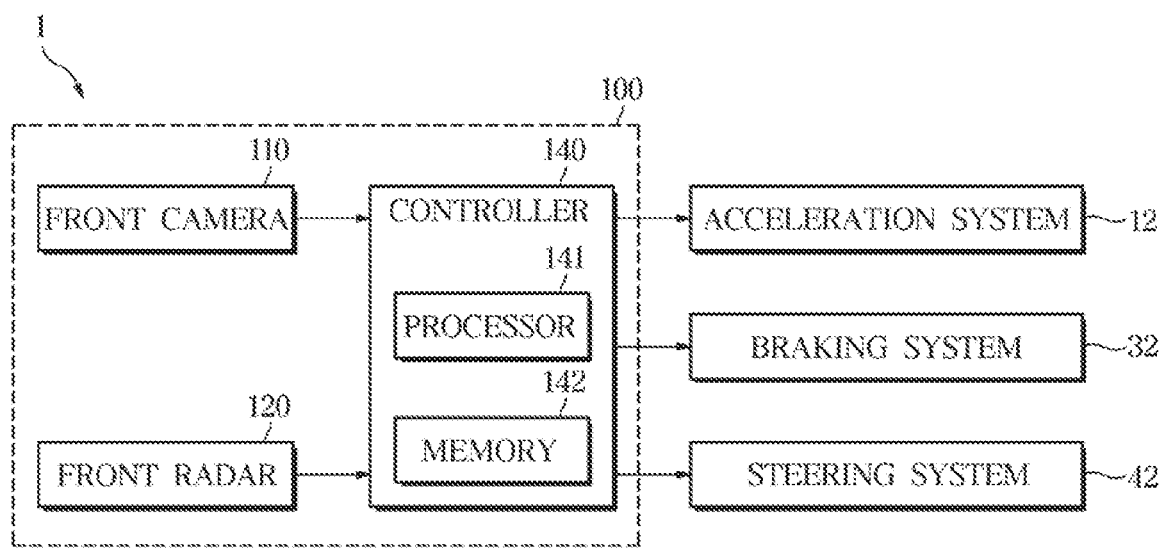
FIG. 2 is a view illustrating a configuration of a smart cruise control system (SCC) according to an embodiment.
Figure 3:
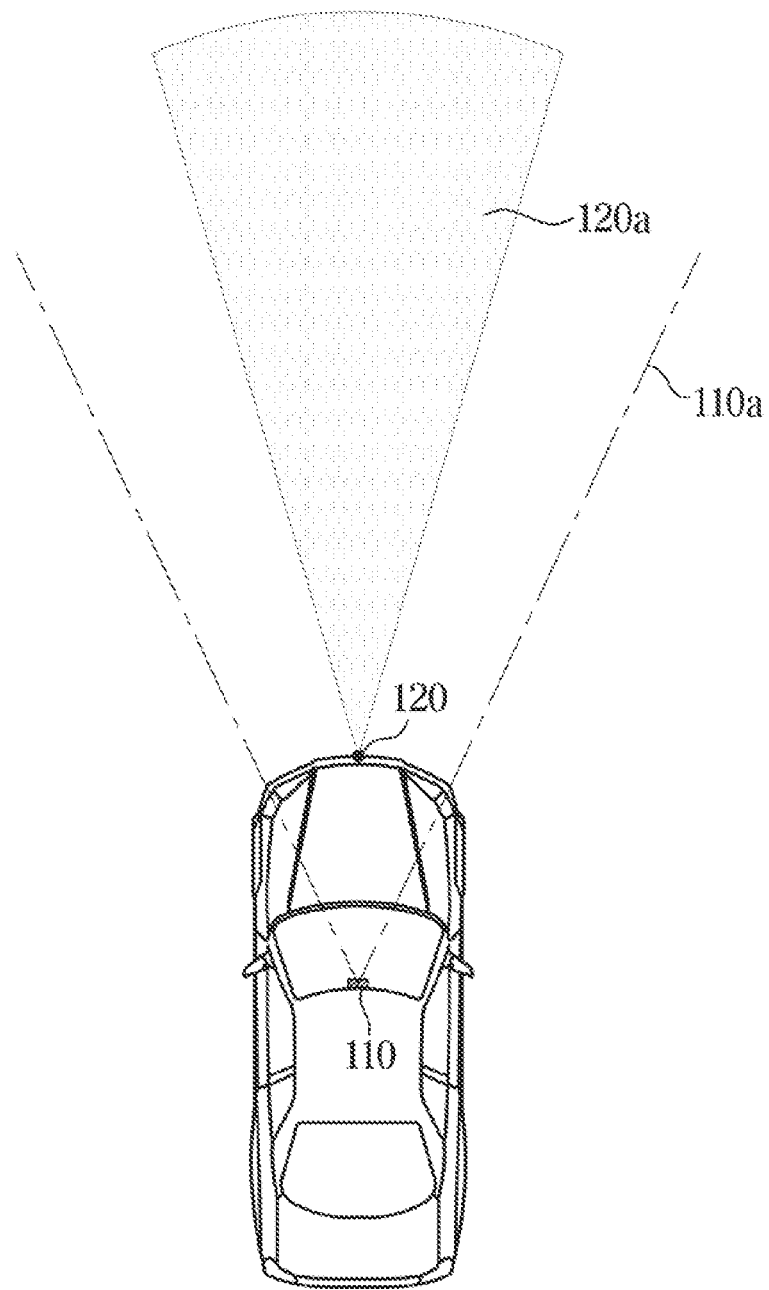
FIG. 3 is a view illustrating a camera and a radar included in an SCC according to an embodiment.

FIG. 2 is a view illustrating a configuration of a smart cruise control system (SCC) according to an embodiment, and FIG. 3 is a view illustrating a camera and a radar included in an SCC according to an embodiment.

Referring to FIG. 2, the vehicle 1 may include an acceleration system 12, a braking system 32, a steering system 42, and the SCC 100.

The acceleration system 12 may include the EMS 11 (see FIG. 1) and the engine 10 (see FIG. 1) described in conjunction with FIG. 1, the braking system 32 may include the EBCM 31 (see FIG. 1) and the braking device 30 (see FIG. 1), and the steering system 42 may include the EPS 41 (see FIG. 1) and the steering device 40 (see FIG. 1).

The SCC 100 may include a front camera 110 and a front radar 120.

Referring to FIG. 3, the front camera 110 may a field of view 110a directed to the front of the vehicle 1. The front camera 110 may be installed on a front windshield of the vehicle 1.

The front camera 110 may image the front of the vehicle 1 and obtain image data regarding the front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through a vehicle communication network NT, through a hard wire, or through a printed circuit board (PCB).

The front camera 110 may transmit the image data of the front of the vehicle 1 to the controller 140.

The front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle. The front radar 120 may obtain front radar data from the transmission radio waves transmitted by the transmission antenna and the reflection radio waves received by the reception antenna. Front radar data may include position information and velocity information regarding an obstacle, such as another vehicle, a pedestrian, or a cyclist existing in front of the vehicle 1. The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

Although not illustrated in the drawing, the SCC 100 may further include a plurality of corner radars. The plurality of corner radars may include a first corner radar installed on the front right side of the vehicle 1, a second corner radar installed on the front left side of the vehicle 1, a third corner radar installed on the rear right side of the vehicle 1, and a fourth corner radar installed on the rear left side of the vehicle 1.

The controller 140 may include the ECU 101b (see FIG. 1) of the camera module 101 (see FIG. 1) and/or the ECU 102b (see FIG. 1) of the radar module 102 (see FIG. 1), and/or an integrated ECU.

The controller 140 includes a processor 141 and a memory 142.

The processor 141 may process the front image data of the front camera 110 and the front radar data of the front radar 120, and generate the driving signal, the braking signal, and the steering signal for controlling the acceleration system 12, the braking system 32, and the steering system 42. For example, the processor 141 may include an image signal processor for processing the front image data of the front camera 110 and/or a digital signal processor for processing radar data of the front radar 120 and/or a micro control unit (MCU) for generating a braking signal and/or a steering signal.

The processor 141 may recognize objects (e.g., front vehicle) in front of the vehicle 1 based on the front image data of the front camera 110 and the front radar data of the front radar 120.

In detail, the processor 141 may obtain positions (distance and direction) and a relative velocity of the objects in front of the vehicle 1 based on the front radar data of the front radar 120. The processor 141 may obtain position information (direction) and type information (for example, whether the object is another vehicle, a pedestrian, a cyclist, or the like) of the object existing in front of the vehicle 1 based on the front image data of the front camera 110. In addition, the processor 141 may match the objects detected by the front image data with the objects detected by the front radar data, and obtain the type information, the position, and the relative velocity of the objects in front of the vehicle 1 based on a result of the matching.

The processor 141 may determine the front vehicle as the target vehicle when the front vehicle recognized from the front image data and the front vehicle recognized from the front radar data match.

That is, when the front vehicle is recognized from both the front image data and the front radar data, the processor 141 may determine the recognized front vehicle as the target vehicle.

For example, when the front vehicle is recognized from the front image data and the front vehicle is not recognized from the front radar data, the processor 141 may not determine the front vehicle as the target vehicle.

Thereafter, the processor 141 may control the acceleration system 12, the braking system 32, and the steering system 42 to maintain a distance between the vehicle 1 and the target vehicle.

For example, in order to maintain the distance between the vehicle 1 and the target vehicle, the processor 141 may control the acceleration system 12 so that the vehicle 1 is accelerated when the distance between the vehicle 1 and the target vehicle is greater than a preset distance.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The SCC 100 is not limited to that illustrated in FIG. 2, and may further include the LiDAR that scans around the vehicle 1 and detects the object.

Hereinafter, a driver assistance method according to an embodiment will be described based on the configuration of the vehicle 1 and the configuration of the SCC 100 described above.

Figure 4:
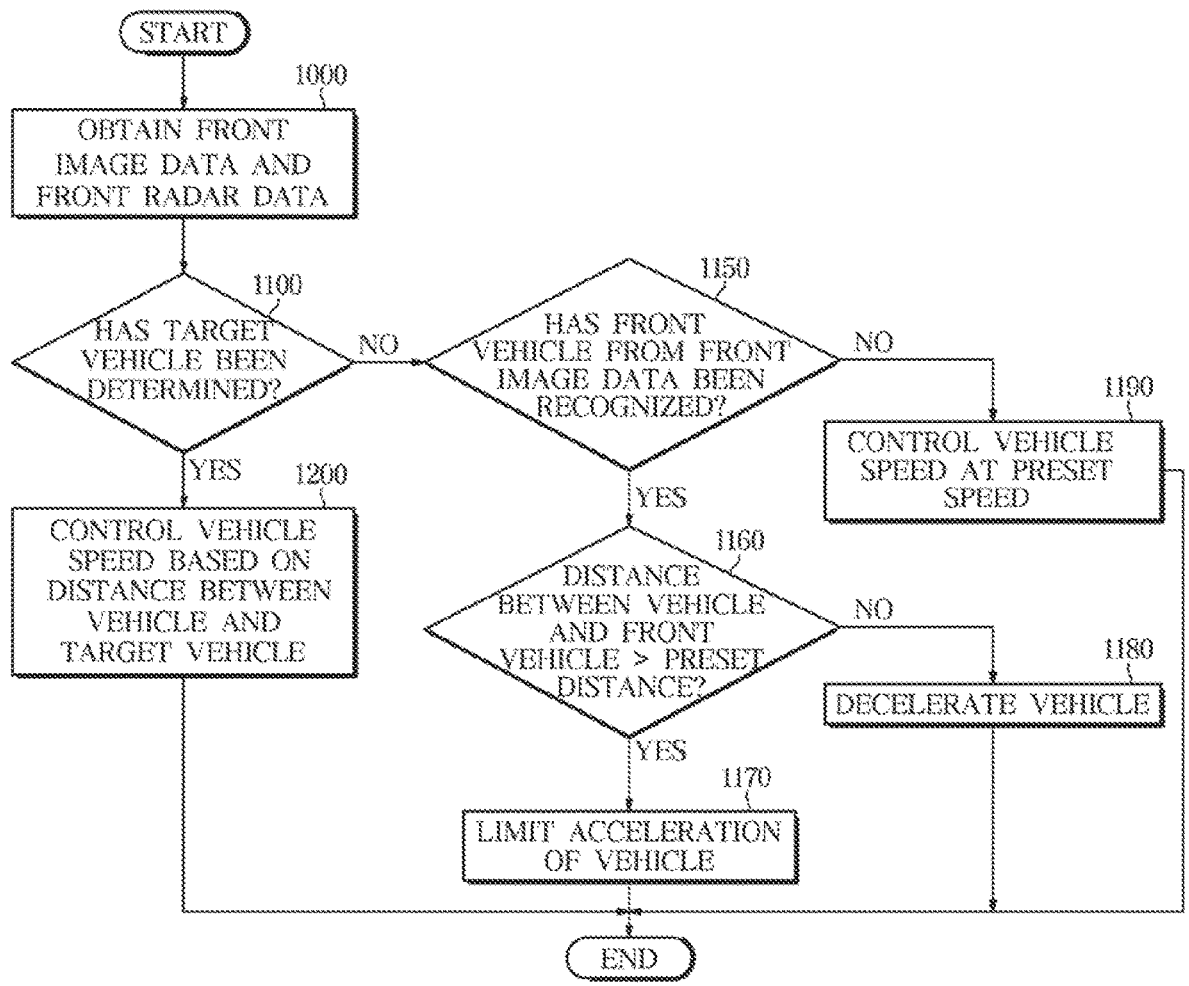
FIG. 4 is a flowchart of a smart cruise control method according to an embodiment.
Figure 5:
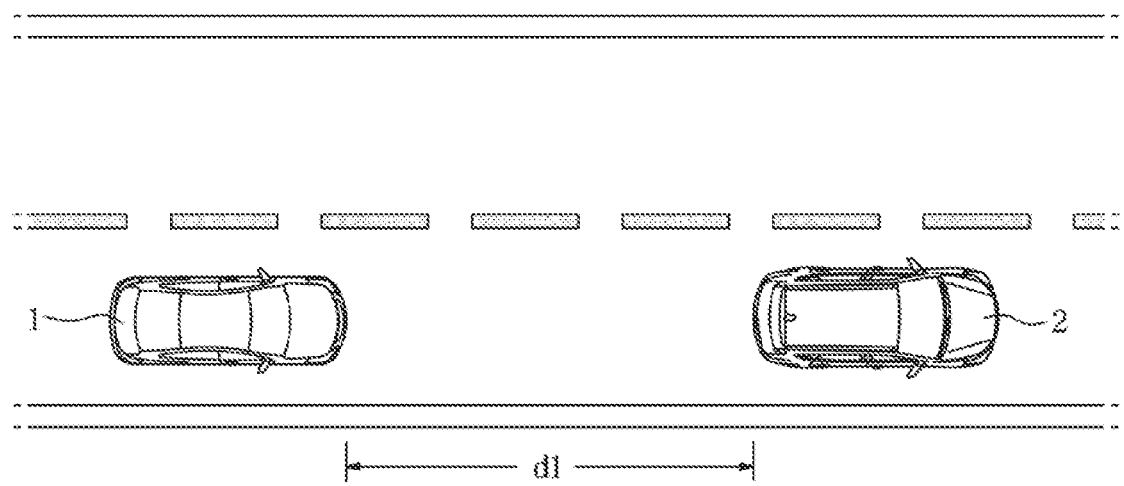
FIG. 5 is a view illustrating a situation in which an SCC determines a target vehicle according to an embodiment.
Figure 6:
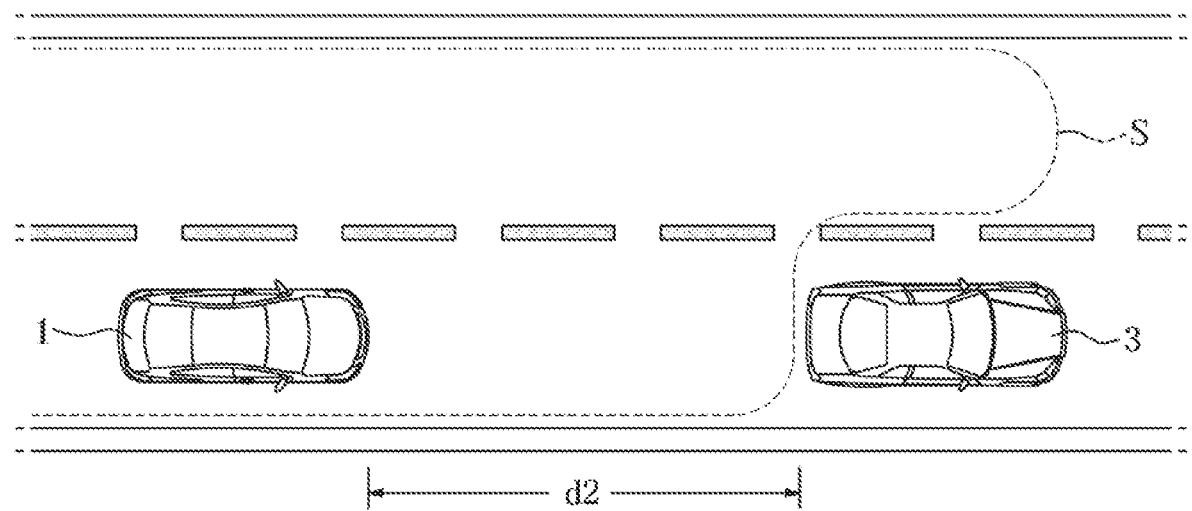
FIG. 6 is a view illustrating a situation in which a front radar does not recognize a front vehicle according to an embodiment.

FIG. 4 is a flowchart of a smart cruise control method according to an embodiment, FIG. 5 is a view illustrating a situation in which an SCC determines a target vehicle according to an embodiment, and FIG. 6 is a view illustrating a situation in which a front radar does not recognize a front vehicle according to an embodiment.

Referring to FIG. 4, the front camera 110 and the front radar 120 may obtain front image data and front radar data of the vehicle 1, respectively (1000).

The controller 140 may process the front image data and the front radar data, and recognize the front vehicle in response to the processing of the front image data and the front radar data.

As illustrated in FIG. 5, when the front vehicle 2 is recognized in both the front image data and the front radar data, the controller 140 may determine the recognized front vehicle 2 as the target vehicle 2 (1100).

When the target vehicle 2 is determined (YES in 1100), the controller 140 may control a speed of the vehicle 1 based on a distance d1 between the vehicle 1 and the target vehicle 2 (1200).

Particularly, the controller 140 may determine a target acceleration of the vehicle 1 based on the distance d1 between the vehicle 1 and the target vehicle 2.

For example, in order to maintain the distance d1 between the vehicle 1 and the target vehicle 2, the controller 140 may control the vehicle 1 so that the vehicle 1 is accelerated when the distance d1 between the vehicle 1 and the target vehicle 2 is greater than the preset distance. When the distance d1 between the vehicle 1 and the target vehicle 2 is less than the preset distance, the controller 140 may control the vehicle 1 so that the vehicle 1 is decelerated, when the distance d1 between the vehicle 1 and the target vehicle 2 is the preset distance, the controller 140 may control the vehicle 1 so that the vehicle 1 is maintained.

In addition, the controller 140 may determine the target acceleration of the vehicle 1 as the distance d1 between the vehicle 1 and the target vehicle 2 increases.

The preset distance may be determined by the user's setting or may be preset by the operator. In addition, the preset distance may be changed according to an input speed input by the user. Information on the preset distance may be stored in the memory 142.

When the front vehicle is not recognized in the front radar data obtained from the front radar 120, that is, the target vehicle is not determined (NO in 1100), the controller 140 may determine whether the front vehicle is recognized from the front image data (1150).

When the front vehicle is not recognized in both the front radar data and the front image data (NO in 1150), the controller 140 may control the vehicle 1 so that the speed of the vehicle 1 becomes a preset speed (1190).

In this case, the preset speed may be the input speed input by the user.

Particularly, the controller 140 may accelerate the vehicle 1 when the current speed of the vehicle 1 is lower than the preset speed, and may maintain the speed of the vehicle 1 when the current speed of the vehicle 1 reaches the preset speed.

Referring to FIG. 6, when a front vehicle 3 is not recognized in the front radar data and the front vehicle 3 is recognized in the front image data (YES in 1150), the controller 140 may limit the acceleration of the vehicle 1 regardless of a distance d2 between the front vehicle 3 and the vehicle 1 (1170, 1180).

Particularly, when the front vehicle 3 is not recognized in the front radar data and the front vehicle 3 is recognized in the front image data, the controller 140 may control the vehicle 1 so that the vehicle 1 is not accelerated even if the distance d2 between the vehicle 1 and the front vehicle 3 recognized in the front image data is greater than the preset distance (1170).

That is, when the front vehicle 3 is determined as the target vehicle, even when the vehicle 1 needs to be controlled to accelerate, when the front vehicle 3 is recognized only in the front image data, the controller 140 may limit the acceleration of the vehicle 1.

At this time, the controller 140 may calculate a free space S based on the front image data, and determine a distance between the vehicle 1 and a boundary line of the free space S in front of the vehicle 1 as the distance between the vehicle 1 and the front vehicle 3.

The free space S may refer to an area in which there is no obstacle and can be driven, determined through the front image data obtained from the front camera 110.

According to the conventional SCC, when the front vehicle is not recognized in the front radar data, it is determined that there is no the target vehicle in the front even if the front vehicle is recognized in the front image data, and the vehicle is accelerated so that the vehicle speed becomes the preset speed. Accordingly, if the front vehicle actually exists in front of the vehicle, there is a risk of collision.

According to the disclosure, when the front vehicle is recognized in the front image data but the front vehicle is not recognized in the front radar data, it is determined that the front image data or the front radar data is temporarily invalid, and acceleration of the vehicle 1 is limited to prevent a collision with the front vehicle 3.

In addition, even if the target vehicle is not determined, when the front vehicle is recognized from the front image data and the distance d2 between the vehicle 1 and the front vehicle 3 is less than the preset distance (NO in 1160), the controller 140 may control the vehicle 1 so that the vehicle 1 is decelerated (1180).

When the front vehicle 3 is recognized in the front image data, but the front vehicle 3 is not recognized in the front radar data, this is to minimize the possibility of the vehicle will fall into the dangerous situation even though the reliability of the fact that the front vehicle actually exists is insufficient.

Based on the lack of reliability that the front vehicle 3 actually exists, when the front vehicle 3 is recognized only in the front image data, and the distance d2 between the vehicle 1 and the front vehicle 3 is less than the preset distance (NO in 1160), the controller 140 may simply limit the acceleration of the vehicle 1.

Since the SCC 100 described in the disclosure relates to the SCC that uses the vehicle recognized in both front radar data and front image data as the target vehicle, it should be distinguished from the SCC that independently uses the front image data or the front radar data.

According to the disclosure, when the radar data obtained from the front radar is temporarily invalid, it may be possible to prevent the dangerous situation by limiting the acceleration of the vehicle.

Embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A smart cruise control system comprising:
   a first sensor mounted to a vehicle, having a field of view in front of the vehicle, and configured to obtain front image data;
   a second sensor mounted to the vehicle, having a field of sensing in front of the vehicle, and configured to obtain front radar data; and
   a controller communicatively connected to the first sensor and the second sensor,
   wherein the controller is configured to:
      recognize a front vehicle based on the front image data and the front radar data,
      determine the recognized front vehicle as a target vehicle in response to the front vehicle being recognized in both the front image data and the front radar data,
      accelerate the vehicle in response to a distance between the vehicle and the target vehicle being greater than a preset distance in order to maintain the distance between the vehicle and the target vehicle,
      in response to the front vehicle being not recognized in the front radar data and the front vehicle being recognized in the front image data, control the vehicle so that the vehicle is not accelerated even if the distance between the vehicle and the front vehicle recognized in the front image data is greater than the preset distance, and
      in response to the front vehicle being not recognized in the front radar data and the front vehicle being recognized in the front image data and the distance between the vehicle and the front vehicle recognized in the front image data being smaller than the preset distance, decelerate the vehicle.

2. The smart cruise control system according to claim 1, wherein, in response to the front vehicle not being recognized in both the front image data and the front radar data, the controller is configured to control the vehicle so that a speed of the vehicle becomes a preset speed.

3. The smart cruise control system according to claim 1, wherein the controller is configured to determine a target acceleration of the vehicle based on the distance between the vehicle and the target vehicle.

4. The smart cruise control system according to claim 1, wherein, in response to the distance between the vehicle and the target vehicle being smaller than the preset distance, the controller is configured to decelerate the vehicle.

5. The smart cruise control system according to claim 1, wherein, in response to the distance between the vehicle and the target vehicle being the preset distance, the controller is configured to control the vehicle to maintain a speed of the vehicle.

6. The smart cruise control system according to claim 1, wherein the controller is configured to calculate a free space based on the front image data, and to determine a distance between the vehicle and a boundary line of the free space in front of the vehicle as the distance between the vehicle and the front vehicle.

7. A method comprising:
   obtaining, from a first sensor, front image data of a vehicle;
   obtaining, from a second sensor, front radar data of the vehicle;
   processing, by a controller, the front image data and the front radar data;
   recognizing, by the controller, a front vehicle based on the front image data and the front radar data;

determining, by the controller, the recognized front vehicle as a target vehicle in response to the front vehicle being recognized in both the front image data and the front radar data;

accelerating, by the controller, the vehicle in response to a distance between the vehicle and the target vehicle being greater than a preset distance in order to maintain the distance between the vehicle and the target vehicle;

in response to the front vehicle being not recognized in the front radar data and the front vehicle being recognized in the front image data, controlling, by the controller, the vehicle so that the vehicle is not accelerated even if the distance between the vehicle and the front vehicle recognized in the front image data is greater than the preset distance; and in response to the front vehicle being not recognized in the front radar data and the front vehicle being recognized in the front image data and the distance between the vehicle and the front vehicle recognized in the front image data being smaller than the preset distance, decelerating, by the controller, the vehicle.

8. The method according to claim 7, further comprising:
in response to the front vehicle not being recognized in both the front image data and the front radar data, controlling, by the controller, the vehicle so that a speed of the vehicle becomes a preset speed.

9. The method according to claim 7, wherein the accelerating of the vehicle in response to a distance between the vehicle and the target vehicle being greater than a preset distance in order to maintain the distance between the vehicle and the target vehicle comprises:
determining a target acceleration of the vehicle based on the distance between the vehicle and the target vehicle; and
accelerating the vehicle with the target acceleration.

10. The method according to claim 7, further comprising:
in response to the distance between the vehicle and the target vehicle being smaller than the preset distance, decelerating, by the controller, the vehicle.

11. The method according to claim 7, further comprising:
in response to the distance between the vehicle and the target vehicle being the preset distance, controlling, by the controller, the vehicle to maintain a speed of the vehicle.

12. The method according to claim 7, wherein the controlling of the vehicle so that the vehicle is not accelerated even if the distance between the vehicle and the front vehicle recognized in the front image data is greater than the preset distance comprises:
calculating a free space based on the front image data; and
determining a distance between the vehicle and a boundary line of the free space in front of the vehicle as the distance between the vehicle and the front vehicle.

13. A non-transitory computer-readable medium storing computer-executable instructions, which when executed by a processor, cause the processor to:
receive front image data of a vehicle and front radar data of the vehicle;
recognize a front vehicle based on the front image data and the front radar data;
determine the recognized front vehicle as a target vehicle in response to the front vehicle being recognized in both the front image data and the front radar data;
accelerate the vehicle in response to a distance between the vehicle and the target vehicle being greater than a preset distance in order to maintain the distance between the vehicle and the target vehicle;
in response to the front vehicle being not recognized in the front radar data and the front vehicle being recognized in the front image data, control the vehicle so that the vehicle is not accelerated even if the distance between the vehicle and the front vehicle recognized in the front image data is greater than the preset distance; and
in response to the front vehicle being not recognized in the front radar data and the front vehicle being recognized in the front image data and the distance between the vehicle and the front vehicle recognized in the front image data being smaller than the preset distance, decelerating, by the controller, the vehicle.

14. The non-transitory computer-readable medium of claim 13, further storing instructions, which when executed by the processor, cause the processor to:
in response to the front vehicle not being recognized in both the front image data and the front radar data, control the vehicle so that a speed of the vehicle becomes a preset speed.

15. The non-transitory computer-readable medium of claim 13, further storing instructions, which when executed by the processor, cause the processor to:
determine a target acceleration of the vehicle based on the distance between the vehicle and the target vehicle; and
accelerate the vehicle with the target acceleration.

16. The non-transitory computer-readable medium of claim 13, further storing instructions, which when executed by the processor, cause the processor to:
in response to the distance between the vehicle and the target vehicle being smaller than the preset distance, decelerate the vehicle.

17. The non-transitory computer-readable medium of claim 13, further storing instructions, which when executed by the processor, cause the processor to:
in response to the distance between the vehicle and the target vehicle being the preset distance, control the vehicle to maintain a speed of the vehicle.

* * * * *